（12) United States Patent
Suh

(10) Patent No.: US 12,254,397 B2
(45) Date of Patent: Mar. 18, 2025

(54) APPARATUS OF IMPLEMENTING ACTIVATION LOGIC FOR NEURAL NETWORK AND METHOD THEREOF

(71) Applicant: GENESYS LOGIC, INC., New Taipei (CN)

(72) Inventor: Woon-Sik Suh, New Taipei (CN)

( * ) Notice: Subject to any disclaimer, the term of this patent is extended or adjusted under 35 U.S.C. 154(b) by 949 days.

(21) Appl. No.: 17/291,315

(22) PCT Filed: May 16, 2019

(86) PCT No.: PCT/CN2019/087299
§ 371 (c)(1),
(2) Date: May 5, 2021

(87) PCT Pub. No.: WO2020/093676
PCT Pub. Date: May 14, 2020

(65) Prior Publication Data
US 2022/0004850 A1   Jan. 6, 2022

Related U.S. Application Data

(60) Provisional application No. 62/756,095, filed on Nov. 6, 2018.

(51) Int. Cl.
*G06N 3/063* (2023.01)
*G06F 1/03* (2006.01)
(Continued)

(52) U.S. Cl.
CPC ............ *G06N 3/063* (2013.01); *G06F 1/03* (2013.01); *G06F 7/50* (2013.01); *G06F 7/523* (2013.01);
(Continued)

(58) Field of Classification Search
CPC ........ G06N 3/045; G06N 3/048; G06N 3/063; G06N 3/08; G06F 1/03; G06F 7/50;
(Continued)

(56) References Cited

U.S. PATENT DOCUMENTS 7,685,355 B2   3/2010   Bond
7,752,417 B2   7/2010   Manczak et al.
(Continued)

FOREIGN PATENT DOCUMENTS

| CN | 101661438 A | 3/2010 | |
|---|---|---|---|
| CN | 104333435 A | 2/2015 | |
| GB | 2601073 A * | 5/2022 | ............. G06N 3/063 |

OTHER PUBLICATIONS

Li et al., "For Activating a Function of Depth Neural Network", published on Jul. 12, 2019, Document ID: CN-110009092-A, pp. 25 (Year: 2019).*

*Primary Examiner* — Chau T Nguyen

(57) ABSTRACT

An apparatus and a method of implementing activation logic for a neural network are described. The apparatus comprises an input unit, a first address translated look-up table, an intermediate storage unit, a second address translated look-up table, and an output unit. The first address translated look-up table includes ($2^{n1}$) first entries that map to ($2^{n1}$) addresses based on the n bits of the input unit. Each the ($2^{n1}$) first entries includes (n1–1) first preset values. The intermediate storage unit includes (n–1) bits. The second address translated look-up table includes ($2^{(n-1)}$) second entries that map to the ($2^{(n-1)}$) bit addresses based on of the (n–1) bits of the intermediate storage unit. Each the ($2^{(n-1)}$) second entries includes (n2+1) second preset values. The output unit is used for outputting n output data values by combining the (n1–1) first preset values and the (n2+1) second preset values.

33 Claims, 5 Drawing Sheets

(51) Int. Cl.
    *G06F 7/50*      (2006.01)
    *G06F 7/523*     (2006.01)
    *G06F 7/53*      (2006.01)
    *G06F 7/544*     (2006.01)
    *G06F 9/54*      (2006.01)
    *G06N 3/048*     (2023.01)
    *G06N 3/08*      (2023.01)

(52) U.S. Cl.
    CPC ............... *G06F 7/53* (2013.01); *G06F 7/5443* (2013.01); *G06F 9/54* (2013.01); *G06N 3/048* (2023.01); *G06N 3/08* (2013.01)

(58) Field of Classification Search
    CPC .......... G06F 7/523; G06F 7/53; G06F 7/5443; G06F 9/54
    See application file for complete search history.

(56) References Cited

U.S. PATENT DOCUMENTS

| | | |
|---|---|---|
| 8,074,050 B2 | 12/2011 | Fan |
| 2010/0318761 A1 | 12/2010 | Moyer et al. |
| 2012/0030203 A1* | 2/2012 | Chiang ............... G06F 16/2237 |
| | | 707/E17.089 |
| 2014/0067739 A1* | 3/2014 | Hombs .................. G06N 3/063 |
| | | 706/25 |
| 2017/0344492 A1 | 11/2017 | Bolbenes et al. |

\* cited by examiner

APPARATUS OF IMPLEMENTING ACTIVATION LOGIC FOR NEURAL NETWORK AND METHOD THEREOF

CROSS REFERENCE TO RELATED APPLICATIONS

This application is a National Phase of PCT Patent Application No. PCT/CN2019/087299 having International filing date of May 16, 2019, which claims the benefit of priority to U.S. Provisional Application No. 62/756,095, filed Nov. 6, 2018. The contents of the above applications are all incorporated by reference as if fully set forth herein in their entirety.

FIELD OF DISCLOSURE

The present disclosure relates to a technical field of neural networks, and more particularly relates to an apparatus of implementing activation logic for a neural network and method thereof.

BACKGROUND

The most common way to implement activation logics in a neural network is to use lookup tables. Basically, a method of performing the lookup tables consumes a number of bits of memory in the neural network of an electronic apparatus. In particular, even if same values of lookup tables are shared with each of neurons in the neural network, a number of multi-level multiplexer of outputs of the activation logics will be used in order to operate the values of lookup tables in parallel, thereby increasing the burden on hardware components of the electronic apparatus. Therefore, there is a need to reduce bit size of the memory of the lookup tables to solve above-mentioned problems.

SUMMARY OF DISCLOSURE

The disclosure provides an apparatus of implementing activation logic for a neural network and method thereof, such that a memory size of neural network is reduced. The apparatus is configured to reduce the memory size of an address translated by mapping input values and output values of the neural network in a multi-stage mode.

Based on the above objective, the present disclosure sets forth an apparatus of implementing activation logic for a neural network, the apparatus comprising: an input unit comprising n bits and n input data values that are stored in the n bits correspondingly, wherein n is defined as a sum of n1 and n2, and n, n1, and n2 are positive integers; a first address translated look-up table comprising $(2^{n1})$ first entries that map to $(2^{n1})$ addresses based on the n bits of the input unit, wherein each of the first entries comprises (n1−1) bits and (n1−1) first preset values stored in the (n1−1) bits correspondingly, and n1 input data values of the n bits of the input unit are mapped to the (n1−1) first preset values that stored in one of the $(2^{n1})$ first entries of the first address translated look-up table; an intermediate storage unit coupled to the input unit and the first address translated look-up table, wherein the intermediate storage unit comprises (n−1) bits by combining (n1−1) bits of the first address translated look-up table with n2 bits of the input unit, and comprises (n−1) intermediate data values by combining the (n1−1) first preset values of the first address translated look-up table with n2 input data values of the n bits of the input unit; a second address translated look-up table comprising $(2^{(n-1)})$ second entries that map to the $(2^{(n-1)})$ bit addresses based on of the (n−1) bits of the intermediate storage unit, wherein each of the $(2^{(n-1)})$ second entries comprises (n2+1) bits and (n2+1) second preset values stored in the (n2+1) bits correspondingly, and the (n−1) intermediate data values of the (n−1) bits of the intermediate storage unit are mapped to the (n2+1) second preset values stored in one of the $(2^{(n-1)})$ second entries of the second address translated look-up table; and an output unit coupled to the first address translated look-up table and the second address translated look-up table, combining (n1−1) bits of the first address translated look-up table with (n2+1) bits of the second address translated look-up table for outputting n output data values by combining the (n1−1) first preset values and the (n2+1) second preset values.

In an embodiment, the apparatus of implementing activation logic for the neural network further comprises a first decoder coupled to the input unit and the first address translated look-up table, decoding n1 bits of the n bits for generating $(2^{n1})$ bit addresses using two to a power of n1.

In an embodiment, the apparatus of implementing activation logic for the neural network further comprises a second decoder coupled to the intermediate storage unit and the second address translated look-up table, decoding (n−1) bits of the intermediate storage unit for generating $(2^{(n-1)})$ bit addresses using two to a power of (n−1).

In an embodiment, in the input unit, n1 bits of the n bits are defined as upper bits of n1 input data values, and n2 bits are defined as lower bits of n2 input data values.

In an embodiment, the (n2+1) bits of each of the $(2^{(n-1)})$ second entries of the second address translated look-up table comprises a bit that is defined as an indicator of a saturation point of the combination of the (n1−1) first preset values and the (n2+1) second preset values.

In an embodiment, in the output unit, the (n1−1) bits of the first address translated look-up table are disposed between the bit of the saturation point and the (n2+1) bits.

In an embodiment, the (n−1) bits of the intermediate storage unit are defined as upper bits of n1 intermediate data values, and the n2 bits of the intermediate storage unit are defined as upper bits of n2 input data values of the input unit.

In an embodiment, the a memory size sum of a product of $(2^{n1})$ bits and (n1−1) bits of the first address translated look-up table and a product of $(2^{(n-1)})$ bits and (n2+1) bits of the second address translated look-up table is less than a memory size sum of a product of $(2^n)$ bits and n bits.

In an embodiment, the product of $(2^{n1})$ bits and (n1−1) bits of the first address translated look-up table is less than the product of $(2^{(n-1)})$ bits and (n2+1) bits of the second address translated look-up table.

In an embodiment, then bits of the input unit further comprise a signed bit.

In an embodiment, when the signed bit is a negative signed bit, the n input data values of the n bits are represented as 2's complement.

In an embodiment, an apparatus of implementing activation logic for a neural network and the apparatus comprises: an input unit comprising n bits and n input data values that are stored in the n bits correspondingly, wherein n is defined as a sum of n1 and n2, and n, n1, and n2 are positive integers; a first address translated look-up table comprising $(2^{n1})$ first entries that map to $(2^{n1})$ bit addresses based on the n bits of the input unit, wherein each of the first entries comprises (n1−1) bits and (n1−1) first preset values stored in the (n1−1) bits correspondingly, and n1 input data values of the n bits of the input unit are mapped to the (n1−1) first preset values that stored in one of the $(2^{n1})$ first entries of the first address translated look-up table; an intermediate storage unit coupled to the input unit and the first address translated look-up table, wherein the intermediate storage unit comprises (n−1) bits by combining (n1−1) bits of the first address translated look-up table with n2 bits of the input unit, and comprises (n−1) intermediate data values by combining the (n1−1) first preset values of the first address translated look-up table with n2 input data values of the n bits of the input unit; and a second address translated look-up table comprising ($2^{(n-1)}$) second entries that map to the ($2^{(n-1)}$) bit addresses based on of the (n−1) bits of the intermediate storage unit, wherein each of the ($2^{(n-1)}$) second entries comprises (n2+1) bits and (n2+1) second preset values stored in the (n2+1) bits correspondingly, and the (n−1) intermediate data values of the (n−1) bits of the intermediate storage unit are mapped to the (n2+1) second preset values stored in one of the ($2^{(n-1)}$) second entries of the second address translated look-up table, wherein the second address translated look-up table outputs n output data values that combines the (n1−1) first preset values and the (n2+1) second preset values.

Based on the above objective, the present disclosure sets forth a method of implementing activation logic for a neural network, the apparatus comprising: inputting, by an input unit, n input data values to n bits, wherein the input data values are stored in then bits correspondingly, and n is defined as a sum of n1 and n2, and n, n1, and n2 are positive integers;

mapping, by a first address translated look-up table, ($2^{n1}$) first entries to ($2^{n1}$) bit addresses based on the n bits of the input unit, wherein each of the first entries comprises (n1−1) bits and (n1−1) first preset values stored in the (n1−1) bits correspondingly, and n1 input data values of the n bits of the input unit are mapped to the (n1−1) first preset values that stored in one of the ($2^{n1}$) first entries of the first address translated look-up table;

combing, by an intermediate storage unit, (n1−1) bits of the first address translated look-up table with n2 bits of the input unit;

combing, by the intermediate storage unit, the (n1−1) first preset values of the first address translated look-up table with n2 input data values of the n bits of the input unit;

mapping, by a second address translated look-up table, ($2^{(n-1)}$) second entries to the ($2^{(n-1)}$) bit addresses based on of the (n−1) bits of the intermediate storage unit, wherein each of the ($2^{(n-1)}$) second entries comprises (n2+1) bits and (n2+1) second preset values stored in the (n2+1) bits correspondingly;

mapping, by the second address translated look-up table, the (n−1) intermediate data values of the (n−1) bits of the intermediate storage unit to the (n2+1) second preset values stored in one of the ($2^{(n-1)}$) second entries of the second address translated look-up table; and combing, by an output unit, (n1−1) bits of the first address translated look-up table with (n2+1) bits of the second address translated look-up table for outputting n output data values by combining the (n1−1) first preset values and the (n2+1) second preset values.

The disclosure provides an apparatus of implementing activation logic for a neural network and method thereof, such that a memory size of neural network is reduced. The apparatus is configured to reduce the memory size of address translated by mapping input values and output values of the neural network in a multi-stage mode, such that the input data values and output data values are mapped by decreasing memory size of the look-up tables when performing activation logic of the neural network.

BRIEF DESCRIPTION OF DRAWINGS

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

DETAILED DESCRIPTION

The following embodiments refer to the accompanying figures for exemplifying specific implementable embodiments of the present disclosure in a suitable computing environment. It should be noted that the exemplary described embodiments are configured to describe and understand the present disclosure, but the present disclosure is not limited thereto. Directional terms, such as an upper side, a lower side, a front side, a back side, a left side, a right side, an inner side, an outer side, and a lateral side, mentioned in the present disclosure are only for reference. Therefore, the directional terms are used for describing and understanding rather than limiting the present disclosure. In the figures, units having similar structures are used for the same reference numbers.

Figure 1:
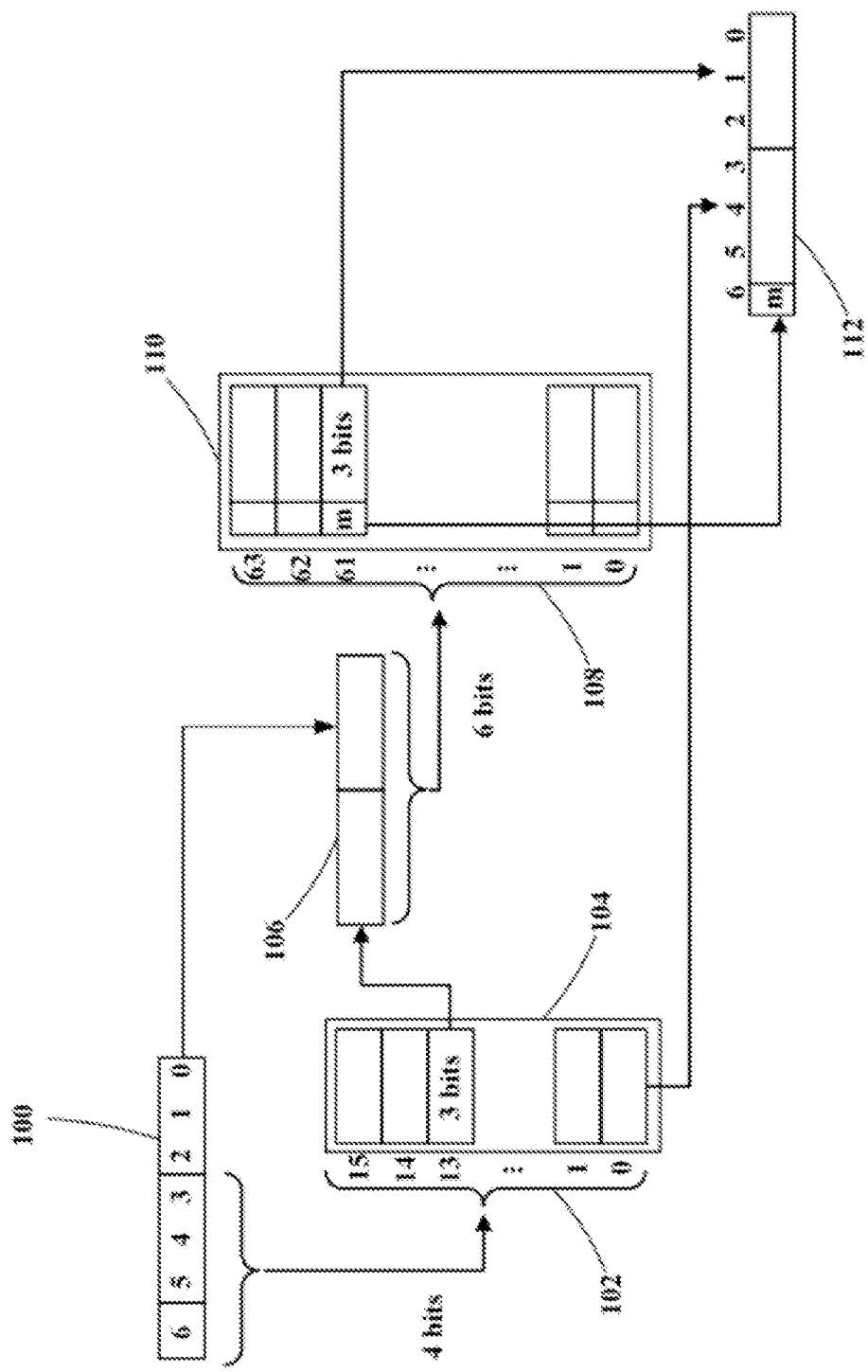
FIG. 1 is a schematic block diagram of an apparatus of implementing activation logic for a neural network using address translated look-up tables according to one embodiment of the present disclosure.

FIG. 1 is a schematic block diagram of an apparatus of implementing activation logic for a neural network using address translated look-up tables according to one embodiment of the present disclosure. The apparatus includes an input unit 100, a first decoder 102, a first address translated look-up table 104, an intermediate storage unit 106, a second decoder 108, a second address translated look-up table 110, and an output unit 112. In one embodiment, the input unit 100, the first decoder 102, the first address translated look-up table 104, the intermediate storage unit 106, the second decoder 108, the second address translated look-up table 110, and the output unit 112 can be implemented by circuits or registers. The neural network can be software programs applications or hardware circuits.

As shown in FIG. 1, the first decoder 102 couples the input unit 100 to the first address translated look-up table 104. The intermediate storage unit 106 couples the first address translated look-up table 104 to the second decoder 108 and is coupled to the input unit 100. The first address translated look-up table 104 is coupled to the output unit 112. The second address translated look-up table 110 couples the second decoder 108 to the output unit 112.

In FIG. 1, the input unit 100 includes n bits and n input data values that are stored in the n bits correspondingly, wherein n is defined as a sum of n1 and n2, and n, n1, and n2 are positive integers. In an embodiment, n is eight, n1 is four, and n2 is three, as shown in FIG. 1, but does not limited to above bit numbers. In another embodiment, n can be more than 8 bits (e.g., 16 bits). The first address translated look-up table 104 includes (2^n1) first entries that map to (2^n1) bit addresses based on the n bits of the input unit 100. Each of the first entries includes (n1−1) bits and (n1−1) first preset values stored in the (n1−1) bits correspondingly, wherein n1 input data values of the n bits of the input unit 112 are mapped to the (n1−1) first preset values that stored in one of the (2^n1) first entries of the first address translated look-up table 104.

As shown in FIG. 1, the intermediate storage unit 106 is coupled to the input unit 100 and the first address translated look-up table 104. The intermediate storage unit 106 includes (n−1) bits by combining (n1−1) bits of the first address translated look-up table 104 with n2 bits of the input unit 104. The intermediate storage unit 106 includes (n−1) intermediate data values by combining the (n1−1) first preset values of the first address translated look-up table 104 with n2 input data values of the n bits of the input unit 100. The second address translated look-up table 110 includes (2^(n−1)) second entries that map to the (2^(n−1)) bit addresses based on of the (n−1) bits of the intermediate storage unit 106. Each of the (2^(n−1)) second entries includes (n2+1) bits and (n2+1) second preset values stored in the (n2+1) bits correspondingly. The (n−1) intermediate data values of the (n−1) bits of the intermediate storage unit 106 are mapped to the (n2+1) second preset values stored in one of the (2^(n−1)) second entries of the second address translated look-up table 110.

In FIG. 1, the output unit 112 is coupled to the first address translated look-up table 104 and the second address translated look-up table 110. The output unit 112 is configured to combine (n1−1) bits of the first address translated look-up table 104 with (n2+1) bits of the second address translated look-up table 110 for outputting n output data values by combining the (n1−1) first preset values and the (n2+1) second preset values.

In an embodiment, the first decoder 102 is coupled to the input unit 100 and the first address translated look-up table 104 and is configured to decode n1 bits of the n bits for generating (2^n1) bit addresses using two to a power of n1. For example, if n1 is 4, (2^n1) bit addresses are in a range from 0 to 15 corresponding to 16 first entries. In an embodiment, the second decoder 108 is coupled to the intermediate storage unit 106 and the second address translated look-up table 110 and is configured to decode (n−1) bits of the intermediate storage unit 106 for generating (2^(n−1)) bit addresses using two to a power of (n−1).

In an embodiment, n1 bits of the n bits are defined as upper bits of n1 input data values of the input unit 100, and n2 bits are defined as lower bits of n2 input data values of the input unit 100.

In an embodiment, the (n2+1) bits of each of the (2^(n−1)) second entries of the second address translated look-up table 110 includes a bit that is defined as an indicator of a saturation point of the combination of the (n1−1) first preset values and the (n2+1) second preset values. In an embodiment, the (n1−1) bits of the first address translated look-up table are disposed between the bit of the saturation point and the (n2+1) bits in the output unit 112.

In an embodiment, the (n−1) bits of the intermediate storage unit 106 are defined as upper bits of n1 intermediate data values, and the n2 bits of the intermediate storage unit 106 are defined as upper bits of n2 input data values of the input unit 100.

In an embodiment, a memory size sum of a product of (2^n1) bits and (n1−1) bits of the first address translated look-up table 104 and a product of (2^(n−1)) bits and (n2+1) bits of the second address translated look-up table 110 is less than a memory size sum of a product of (2^n) bits and n bits.

In an embodiment, the n bits of the input unit 100 further include a signed bit. When the signed bit is a negative signed bit, the n input data values of the n bits are represented as 2's complement.

In embodiments of the present disclosure, an apparatus of implementing activation logic for a neural network is configured to reduce the memory size of address translated tables by mapping input data values and output data values of the neural network in a multi-stage mode (e.g., a first stage mode and a second stage mode). For example, the first address translated look-up table 104 is defined as a first stage mode and the second address translated look-up table 110 that is coupled to the first address translated look-up table 104 via the first address translated look-up table 104 and the second decoder 108, such that the input data values and output data values are mapped by decreasing memory size of the look-up tables when performing activation logic of the neural network.

Figure 2:
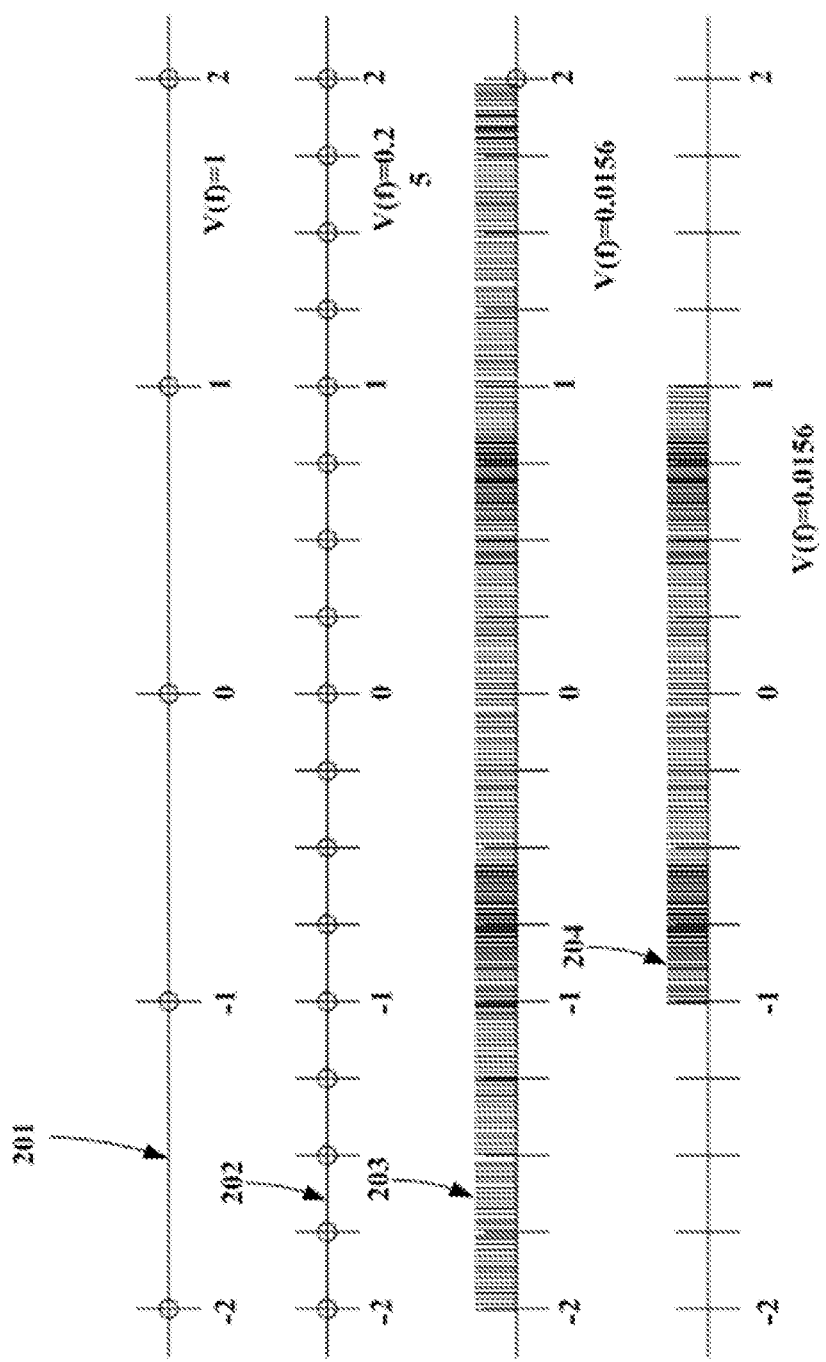
FIG. 2 is a schematic diagram of a number system and a plurality of data ranges of bit configurations according to one embodiment of the present disclosure.

FIG. 2 is a schematic diagram of a number system and a plurality of data ranges of bit configurations according to one embodiment of the present disclosure. Q(1.0) 201 is defined as 2 bit signed integer without fractional bits (e.g., from −2 to 1). Q(1.2) 202 is defined as 4 bit signed fixed-point rational with fractional 2 bits (e.g., from −2 to 1.75). Q(1.6) 203 is defined as 8 bit signed fixed-point rational with fractional 6 bits (e.g., from −2 to 1.984). After performing the activation logic, the number system is the same and actual data values are compressed between −1 and +1. For example, Q(1.6) is defined as 8 bit signed fixed-point rational with fractional 6 bits (e.g., −2 to 1.984) and actual output data values of the activation logic are translated into a range from −1 to 1, as shown a reference number 204. Similarly, in a number system of 2's complement, input and output fraction of activator is same as Q(1.6).

Figure 3:
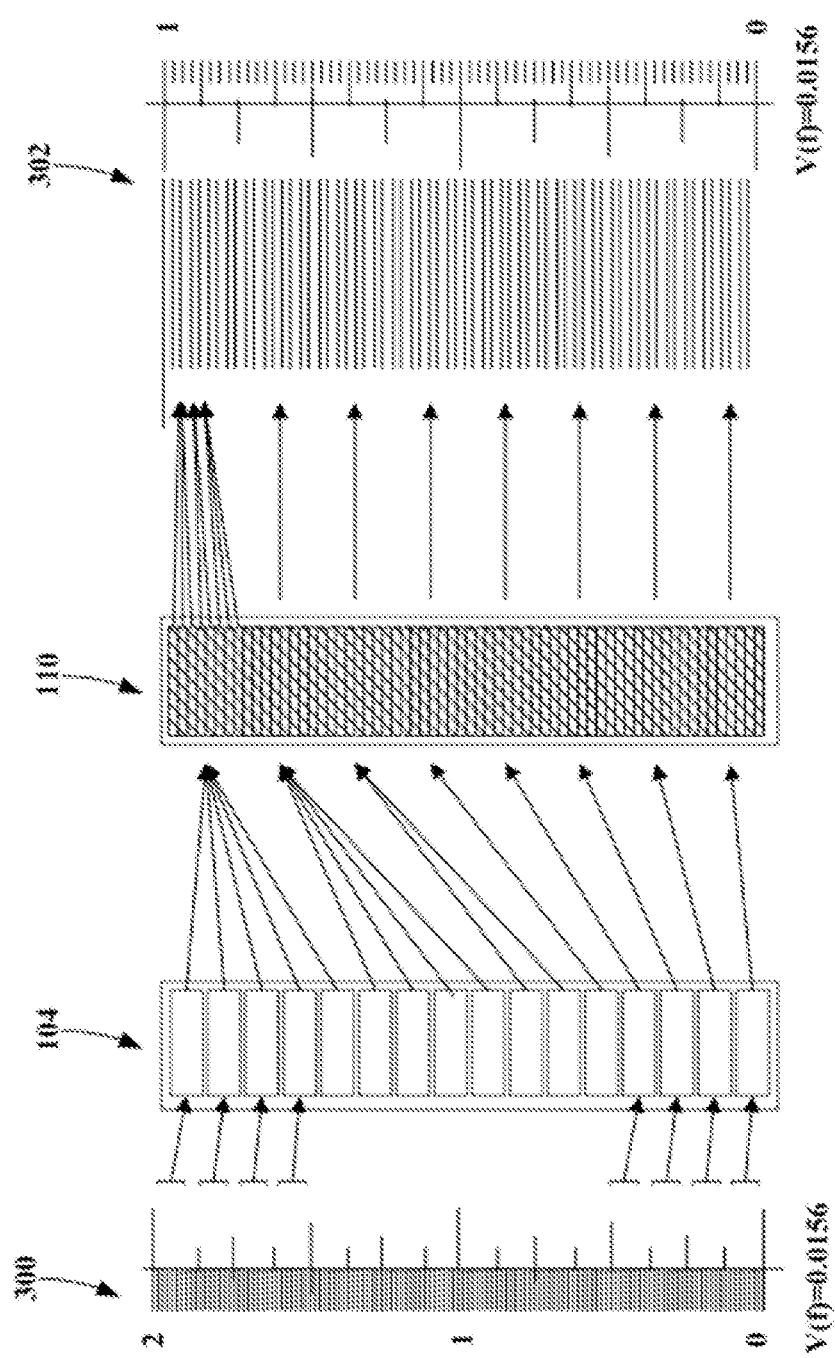
FIG. 3 is a schematic diagram of a mapping configuration of address translated look-up tables having a half range operation according to one embodiment of the present disclosure.

FIG. 3 is a schematic diagram of a mapping configuration of address translated look-up tables having a half range operation according to one embodiment of the present disclosure. Referring to FIG. 1 and FIG. 3, the n1 input data values of the n1 bits (e.g., 4 bits) of the input unit 100 includes a first range 300 from 0 to 2. The 16 first entries of the first address translated look-up table 104 map to 16 bit addresses based on the 4 bits of the input unit 100. For example, if n1 is 4, (2^n1) bit addresses are in a range from 0 to 15 corresponding to 16 first entries. Specifically, the 16 first entries (i.e., 16 first preset values) of the first address translated look-up table 104 coarsely map to the intermediate storage unit 106 using 3 bits of each of the 16 first entries.

In FIG. 1 and FIG. 3, the 64 second entries of the second address translated look-up table 110 map to 64 bit addresses based on the 6 bits of the intermediate storage unit 106. For example, if n is 7, (2^(n−1)) bit addresses are in a range from 0 to 63 corresponding to 64 first entries. Specifically, the 64 second entries (i.e., 64 second preset values) of the second address translated look-up table 110 finely map to the output unit 112 using 3 bits of each of the 64 second entries besides an indicator bit "m". Then output data values of the n bits (e.g., 7 bits) of the output unit 112 includes a second range 302 from 0 to 1.

In FIG. 1 and FIG. 3, the first address translated look-up table 104 corresponding to the first range 300 from 0 to 2 maps to the second address translated look-up table 110 corresponding to the second range 302 from 0 to 1, such that the n output data values of the input unit 100 are represented from 0 to 1. The maximum data values are determined by indicator bit. When the n output data values of the input unit 100 are represented from −1 to 1, 2's complement of the signed bit are used according to the signed bit at the output unit 112.

Figure 4:
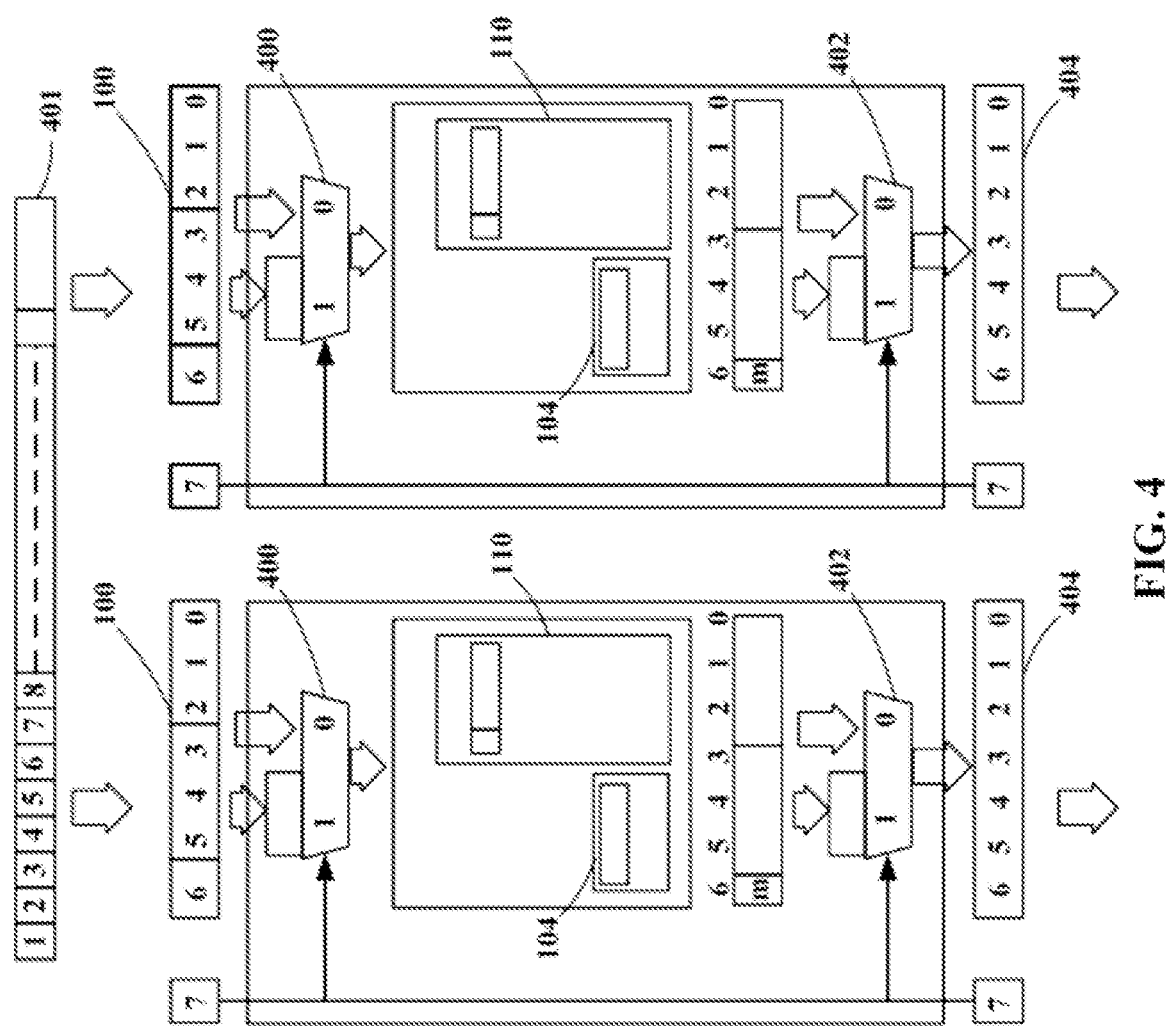
FIG. 4 is a schematic block diagram of two activators using address translated look-up tables according to one embodiment of the present disclosure.

FIG. 4 is a schematic block diagram of two activators using address translated look-up tables according to one embodiment of the present disclosure. Each of the activators is implemented by an apparatus of implementing activation logic, as shown in FIG. 4, a first multiplexer circuit 400, and a second multiplexer circuit 402. In addition, when the n bits of the input unit 100 connected to a line buffer 401 further comprise a signed bit, a first multiplexer circuit 400 is disposed among the input unit 100, the first address translated look-up table 104, and a second address translated look-up table 110. A second multiplexer circuit 402 is disposed between the output unit 112 and an output buffer 404.

Figure 5:
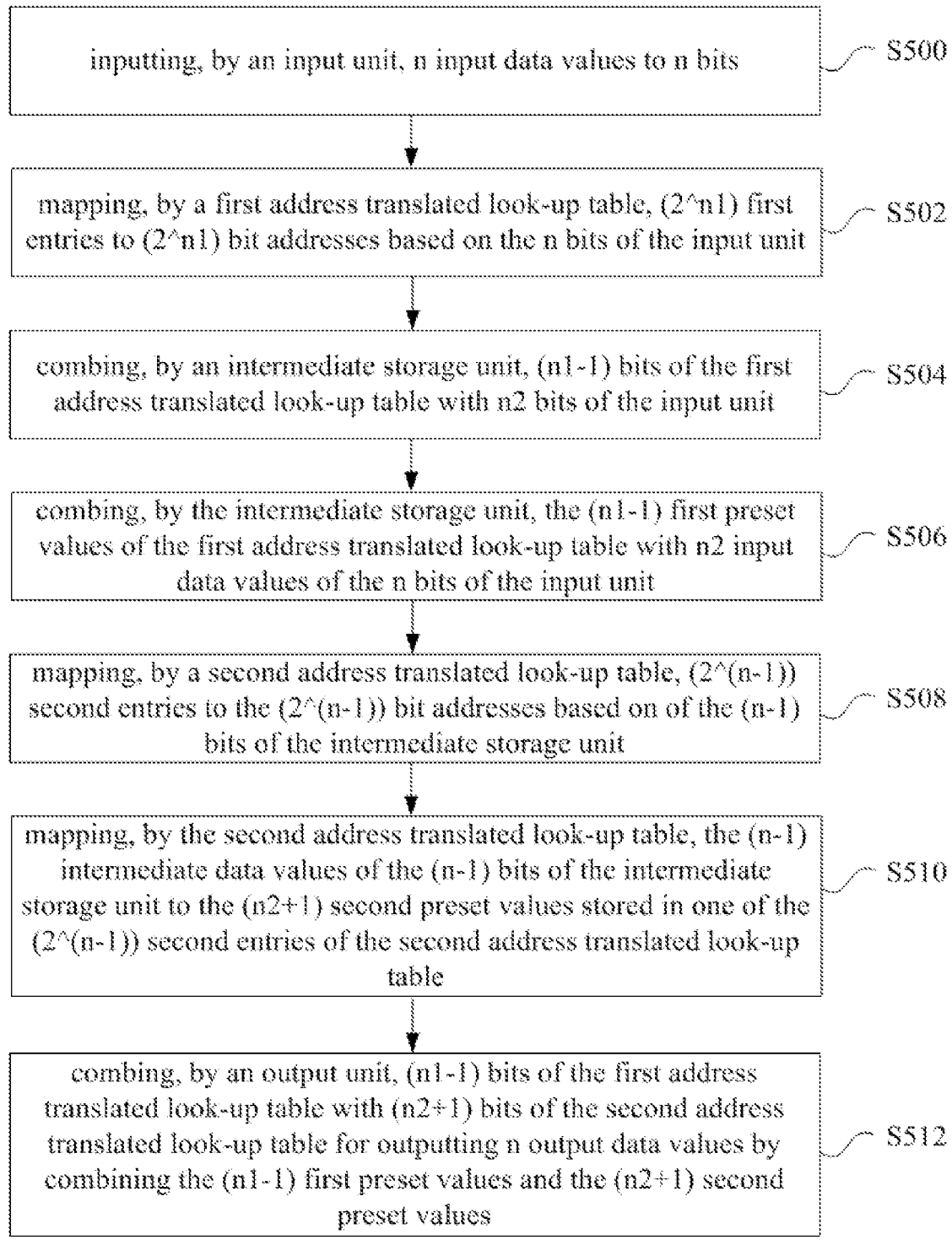
FIG. 5 is a flowchart of a method of implementing activation logic for a neural network using address translated look-up tables according to one embodiment of the present disclosure.

FIG. 5 is a flowchart of a method of implementing activation logic for a neural network using address translated look-up tables according to one embodiment of the present disclosure. The method includes following steps.

At a step S500, inputting, by an input unit, n input data values to n bits is performed, wherein the input data values are stored in the n bits correspondingly, and n is defined as a sum of $n1$ and $n2$, and n, $n1$, and $n2$ are positive integers. In one embodiment, decoding, by a first decoder, $n1$ bits of the n bits for generating $(2^{n1})$ bit addresses using two to a power of $n1$ is performed.

At a step S502, mapping, by a first address translated look-up table, $(2^{n1})$ first entries to $(2^{n1})$ bit addresses based on the n bits of the input unit is performed, wherein each of the first entries comprises $(n1-1)$ bits and $(n1-1)$ first preset values stored in the $(n1-1)$ bits correspondingly, and $n1$ input data values of the n bits of the input unit are mapped to the $(n1-1)$ first preset values that stored in one of the $(2^{n1})$ first entries of the first address translated look-up table.

At a step S504, combing, by an intermediate storage unit, $(n1-1)$ bits of the first address translated look-up table with $n2$ bits of the input unit is performed.

At a step S506, combing, by the intermediate storage unit, the $(n1-1)$ first preset values of the first address translated look-up table with $n2$ input data values of the n bits of the input unit is performed.

At a step S508, mapping, by a second address translated look-up table, $(2^{(n-1)})$ second entries to the $(2^{(n-1)})$ bit addresses based on of the $(n-1)$ bits of the intermediate storage unit is performed, wherein each of the $(2^{(n-1)})$ second entries comprises $(n2+1)$ bits and $(n2+1)$ second preset values stored in the $(n2+1)$ bits correspondingly. In one embodiment, decoding, by a second decoder, $(n-1)$ bits of the intermediate storage unit for generating $(2^{(n-1)})$ bit addresses using two to a power of $(n-1)$ is performed.

At a step S510, mapping, by the second address translated look-up table, the $(n-1)$ intermediate data values of the $(n-1)$ bits of the intermediate storage unit to the $(n2+1)$ second preset values stored in one of the $(2^{(n-1)})$ second entries of the second address translated look-up table is performed.

At a step S512, combing, by an output unit, $(n1-1)$ bits of the first address translated look-up table with $(n2+1)$ bits of the second address translated look-up table for outputting n output data values by combining the $(n1-1)$ first preset values and the $(n2+1)$ second preset values is performed.

In one embodiment, in the input unit, $n1$ bits of the n bits are defined as upper bits of $n1$ input data values, and $n2$ bits are defined as lower bits of $n2$ input data values.

In one embodiment, the $(n2+1)$ bits of each of the $(2^{(n-1)})$ second entries of the second address translated look-up table comprises a bit that is defined as an indicator of a saturation point of the combination of the $(n1-1)$ first preset values and the $(n2+1)$ second preset values.

In one embodiment, in the output unit, the $(n1-1)$ bits of the first address translated look-up table are disposed between the bit of the saturation point and the $(n2+1)$ bits.

In one embodiment, the $(n-1)$ bits of the intermediate storage unit are defined as upper bits of $n1$ intermediate data values, and the $n2$ bits of the intermediate storage unit are defined as upper bits of $n2$ input data values of the input unit.

In one embodiment, a memory size sum of a product of $(2^{n1})$ bits and $(n1-1)$ bits of the first address translated look-up table and a product of $(2^{(n-1)})$ bits and $(n2+1)$ bits of the second address translated look-up table is less than a memory size sum of a product of $(2^n)$ bits and n bits.

In one embodiment, the product of $(2^{n1})$ bits and $(n1-1)$ bits of the first address translated look-up table is less than the product of $(2^{(n-1)})$ bits and $(n2+1)$ bits of the second address translated look-up table.

In one embodiment, the n bits of the input unit further comprise a signed bit.

In one embodiment, when the signed bit is a negative signed bit, the n input data values of the n bits are represented as 2's complement.

In one embodiment, an apparatus of implementing activation logic for a neural network includes a processor and a memory, wherein the memory is configured to store executable program instructions, and the processor is configured to execute the executable program instructions performing above-mentioned steps S500 to S512.

In the description of the present disclosure, reference is made to the term "one embodiment", "certain embodiments", "exemplary embodiments", "some embodiments", "examples", "specific examples", or "some examples" and the like, and are intended to refer to specific features described in connection with the embodiments or examples, structure, material or characteristic that is included in at least one embodiment or example of the present disclosure. In the present disclosure, the schematic expressions of the terms are not necessarily referring to the same embodiment or example. Moreover, the described specific features, structures, materials, or features may be combined in any suitable manner in any one or more embodiments or examples of the present disclosure. The actions of the method disclosed by the embodiments of present disclosure can be embodied directly as a hardware decoding processor can be directly executed by a hardware decoding processor, or by combinations of hardware and software codes in a decoding processor. The software codes can be stored in a storage medium selected from one group consisting of random access memory, a flash memory, a read-only memory, a programmable read-only memory, an electrically erasable programmable memory, and registers. The processor read information (e.g., instructions) in the memory and completes the above-mentioned actions of the method in combination with hardware.

According to the above-mentioned descriptions, the disclosure provides an apparatus of implementing activation logic for a neural network and method thereof, such that a memory size of neural network is reduced. The apparatus is configured to reduce the memory size of address translated by mapping input values and output values of the neural network in a multi-stage mode, such that the input data values and output data values are mapped by decreasing memory size of the look-up tables when performing activation logic of the neural network.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. An apparatus of implementing activation logic for a neural network comprises a processor and a memory, wherein the memory is configured to store executable program instructions, and the processor is configured to execute the executable program instructions, the apparatus comprising:
an input circuit comprising n bits and n input data values that are stored in the n bits correspondingly, wherein n is defined as a sum of n1 and n2, and n, n1, and n2 are positive integers;
a first address translated look-up table circuit comprising (2^n1) first entries that map to (2^n1) bit addresses based on the n bits of the input circuit, wherein each of the (2^n1) first entries comprises (n1−1) bits and (n1−1) first preset values stored in the (n1−1) bits correspondingly, and n1 input data values of the n bits of the input circuit are mapped to the (n1−1) first preset values that stored in one of the (2^n1) first entries of the first address translated look-up table circuit;
an intermediate storage circuit coupled to the input circuit and the first address translated look-up table circuit, wherein the intermediate storage circuit comprises (n−1) bits by combining the (n1−1) bits of the first address translated look-up table circuit with n2 bits of the input circuit, and comprises (n−1) intermediate data values by combining the (n1−1) first preset values of the first address translated look-up table circuit with n2 input data values of the n bits of the input circuit;
a second address translated look-up table circuit comprising (2^(n−1)) second entries that map to (2^(n−1)) bit addresses based on of the (n−1) bits of the intermediate storage circuit, wherein each of the (2^(n−1)) second entries comprises (n2+1) bits and (n2+1) second preset values stored in the (n2+1) bits correspondingly, and the (n−1) intermediate data values of the (n−1) bits of the intermediate storage circuit are mapped to the (n2+1) second preset values stored in one of the (2^(n−1)) second entries of the second address translated look-up table circuit; and
an output circuit coupled to the first address translated look-up table circuit and the second address translated look-up table circuit, combining the (n1−1) bits of the first address translated look-up table circuit with the (n2+1) bits of the second address translated look-up table circuit for outputting n output data values by combining the (n1−1) first preset values and the (n2+1) second preset values.

2. The apparatus of implementing activation logic for the neural network according to claim 1, further comprising a first decoder coupled to the input circuit and the first address translated look-up table circuit, decoding n1 bits of the n bits for generating the (2^n1) bit addresses using two to a power of n1.

3. The apparatus of implementing activation logic for the neural network according to claim 1, further comprising a second decoder coupled to the intermediate storage circuit and the second address translated look-up table circuit, decoding the (n−1) bits of the intermediate storage circuit for generating the (2^(n−1)) bit addresses using two to a power of (n−1).

4. The apparatus of implementing activation logic for the neural network according to claim 1, wherein, in the input circuit, n1 bits of the n bits are defined as upper bits of the n1 input data values, and the n2 bits are defined as lower bits of the n2 input data values.

5. The apparatus of implementing activation logic for the neural network according to claim 1, wherein the (n2+1) bits of each of the (2^(n−1)) second entries of the second address translated look-up table circuit comprises a bit that is defined as an indicator of a saturation point of the combination of the (n1−1) first preset values and the (n2+1) second preset values.

6. The apparatus of implementing activation logic for the neural network according to claim 5, wherein, in the output circuit, the (n1−1) bits of the first address translated look-up table circuit are disposed between the bit of the saturation point and the (n2+1) bits.

7. The apparatus of implementing activation logic for the neural network according to claim 1, wherein the (n−1) bits of the intermediate storage circuit are defined as upper bits of n1 intermediate data values, and the n2 bits of the intermediate storage circuit are defined as upper bits of the n2 input data values of the input circuit.

8. The apparatus of implementing activation logic for the neural network according to claim 1, wherein a memory size sum of a product of (2^n1) bits and the (n1−1) bits of the first address translated look-up table circuit and a product of (2^(n−1)) bits and the (n2+1) bits of the second address translated look-up table circuit is less than a memory size sum of a product of (2^n) bits and the n bits.

9. The apparatus of implementing activation logic for the neural network according to claim 8, wherein the product of the (2^n1) bits and the (n1−1) bits of the first address translated look-up table circuit is less than the product of the (2^(n−1)) bits and the (n2+1) bits of the second address translated look-up table circuit.

10. The apparatus of implementing activation logic for the neural network according to claim 1, wherein the n bits of the input circuit further comprise a signed bit.

11. The apparatus of implementing activation logic for the neural network according to claim 10, wherein when the signed bit is a negative signed bit, the n input data values of the n bits are represented as 2's complement.

12. A method of implementing activation logic for a neural network, the method comprising:
inputting, by an input unit, n input data values to n bits, wherein the input data values are stored in the n bits correspondingly, and n is defined as a sum of n1 and n2, and n, n1, and n2 are positive integers;
mapping, by a first address translated look-up table, (2^n1) first entries to (2^n1) bit addresses based on the n bits of the input unit, wherein each of the (2^n1) first entries comprises (n1−1) bits and (n1−1) first preset values stored in the (n1−1) bits correspondingly, and n1 input data values of the n bits of the input unit are mapped to the (n1−1) first preset values that stored in one of the (2^n1) first entries of the first address translated look-up table;

combing, by an intermediate storage unit, (n1−1) bits of the first address translated look-up table with n2 bits of the input unit;

combing, by the intermediate storage unit, the (n1−1) first preset values of the first address translated look-up table with n2 input data values of the n bits of the input unit;

mapping, by a second address translated look-up table, (2^(n−1)) second entries to the (2^(n−1)) bit addresses based on of the (n−1) bits of the intermediate storage unit, wherein each of the (2^(n−1)) second entries comprises (n2+1) bits and (n2+1) second preset values stored in the (n2+1) bits correspondingly;

mapping, by the second address translated look-up table, (n−1) intermediate data values of the (n−1) bits of the intermediate storage unit to the (n2+1) second preset values stored in one of the (2^(n−1)) second entries of the second address translated look-up table; and combing, by an output unit, the (n1−1) bits of the first address translated look-up table with the (n2+1) bits of the second address translated look-up table for outputting n output data values by combining the (n1−1) first preset values and the (n2+1) second preset values.

13. The method of implementing activation logic for the neural network according to claim 12, further comprising decoding, by a first decoder, n1 bits of the n bits for generating the (2^n1) bit addresses using two to a power of n1.

14. The method of implementing activation logic for the neural network according to claim 12, further comprising decoding, by a second decoder, the (n−1) bits of the intermediate storage unit for generating the (2^(n−1)) bit addresses using two to a power of (n−1).

15. The method of implementing activation logic for the neural network according to claim 12, wherein, in the input unit, n1 bits of the n bits are defined as upper bits of the n1 input data values, and the n2 bits are defined as lower bits of the n2 input data values.

16. The method of implementing activation logic for the neural network according to claim 12, wherein the (n2+1) bits of each of the (2^(n−1)) second entries of the second address translated look-up table comprises a bit that is defined as an indicator of a saturation point of the combination of the (n1−1) first preset values and the (n2+1) second preset values.

17. The method of implementing activation logic for the neural network according to claim 16, wherein, in the output unit, the (n1−1) bits of the first address translated look-up table are disposed between the bit of the saturation point and the (n2+1) bits.

18. The method of implementing activation logic for the neural network according to claim 12, wherein the (n−1) bits of the intermediate storage unit are defined as upper bits of n1 intermediate data values, and the n2 bits of the intermediate storage unit are defined as upper bits of the n2 input data values of the input unit.

19. The method of implementing activation logic for the neural network according to claim 12, wherein a memory size sum of a product of (2^n1) bits and the (n1−1) bits of the first address translated look-up table and a product of (2^(n−1)) bits and the (n2+1) bits of the second address translated look-up table is less than a memory size sum of a product of (2^n) bits and the n bits.

20. The method of implementing activation logic for the neural network according to claim 19, wherein the product of the (2^n1) bits and the (n1−1) bits of the first address translated look-up table is less than the product of the (2^(n−1)) bits and the (n2+1) bits of the second address translated look-up table.

21. The method of implementing activation logic for the neural network according to claim 12, wherein the n bits of the input unit further comprise a signed bit.

22. The method of implementing activation logic for the neural network according to claim 21, wherein when the signed bit is a negative signed bit, the n input data values of the n bits are represented as 2's complement.

23. A non-transitory computer readable storage medium storing executable program instructions that when executed by a processor cause at least one computer to perform operations comprising:

inputting, by an input unit, n input data values to n bits, wherein the input data values are stored in the n bits correspondingly, and n is defined as a sum of n1 and n2, and n, n1, and n2 are positive integers;

mapping, by a first address translated look-up table, (2^n1) first entries to (2^n1) bit addresses based on the n bits of the input unit, wherein each of the (2^n1) first entries comprises (n1−1) bits and (n1−1) first preset values stored in the (n1−1) bits correspondingly, and n1 input data values of the n bits of the input unit are mapped to the (n1−1) first preset values that stored in one of the (2^n1) first entries of the first address translated look-up table;

combing, by an intermediate storage unit, (n1−1) bits of the first address translated look-up table with n2 bits of the input unit;

combining, by the intermediate storage unit, the (n1−1) first preset values of the first address translated look-up table with n2 input data values of the n bits of the input unit;

mapping, by a second address translated look-up table, (2^(n−1)) second entries to the (2^(n−1)) bit addresses based on of the (n−1) bits of the intermediate storage unit, wherein each of the (2^(n−1)) second entries comprises (n2+1) bits and (n2+1) second preset values stored in the (n2+1) bits correspondingly;

mapping, by the second address translated look-up table, (n−1) intermediate data values of the (n−1) bits of the intermediate storage unit to the (n2+1) second preset values stored in one of the (2^(n−1)) second entries of the second address translated look-up table; and combining, by an output unit, the (n1−1) bits of the first address translated look-up table with the (n2+1) bits of the second address translated look-up table for outputting n output data values by combining the (n1−1) first preset values and the (n2+1) second preset values.

24. The non-transitory computer readable storage medium according to claim 23, wherein the computer is further caused to perform: decoding, by a first decoder, n1 bits of the n bits for generating the (2^n1) bit addresses using two to a power of n1.

25. The non-transitory computer readable storage medium according to claim 23, wherein the computer is further caused to perform: decoding, by a second decoder, the (n−1) bits of the intermediate storage unit for generating the (2^(n−1)) bit addresses using two to a power of (n−1).

26. The non-transitory computer readable storage medium according to claim 23, wherein, in the input unit, n1 bits of the n bits are defined as upper bits of the n1 input data values, and the n2 bits are defined as lower bits of the n2 input data values.

27. The non-transitory computer readable storage medium according to claim 23, wherein the (n2+1) bits of each of the (2^(n−1)) second entries of the second address translated look-up table comprises a bit that is defined as an indicator of a saturation point of the combination of the (n1−1) first preset values and the (n2+1) second preset values.

28. The non-transitory computer readable storage medium according to claim 23, wherein, in the output unit, the (n1−1) bits of the first address translated look-up table are disposed between the bit of the saturation point and the (n2+1) bits.

29. The non-transitory computer readable storage medium according to claim 23, wherein the (n−1) bits of the intermediate storage unit are defined as upper bits of n1 intermediate data values, and the n2 bits of the intermediate storage unit are defined as upper bits of the n2 input data values of the input unit.

30. The non-transitory computer readable storage medium according to claim 23, wherein a memory size sum of a product of (2^n1) bits and the (n1−1) bits of the first address translated look-up table and a product of (2^(n−1)) bits and the (n2+1) bits of the second address translated look-up table is less than a memory size sum of a product of (2^n) bits and the n bits.

31. The non-transitory computer readable storage medium according to claim 23, wherein the computer is further caused to perform: wherein the product of the (2^n1) bits and the (n1−1) bits of the first address translated look-up table is less than the product of the (2^(n−1)) bits and the (n2+1) bits of the second address translated look-up table.

32. The non-transitory computer readable storage medium according to claim 23, wherein the n bits of the input unit further comprise a signed bit.

33. The non-transitory computer readable storage medium according to claim 32, wherein when the signed bit is a negative signed bit, the n input data values of the n bits are represented as 2's complement.

* * * * *